March 31, 1925. 1,531,529
O. A. TONN
TRANSMISSION MECHANISM
Filed July 22, 1924 4 Sheets-Sheet 2

Inventor
Otto A. Tonn

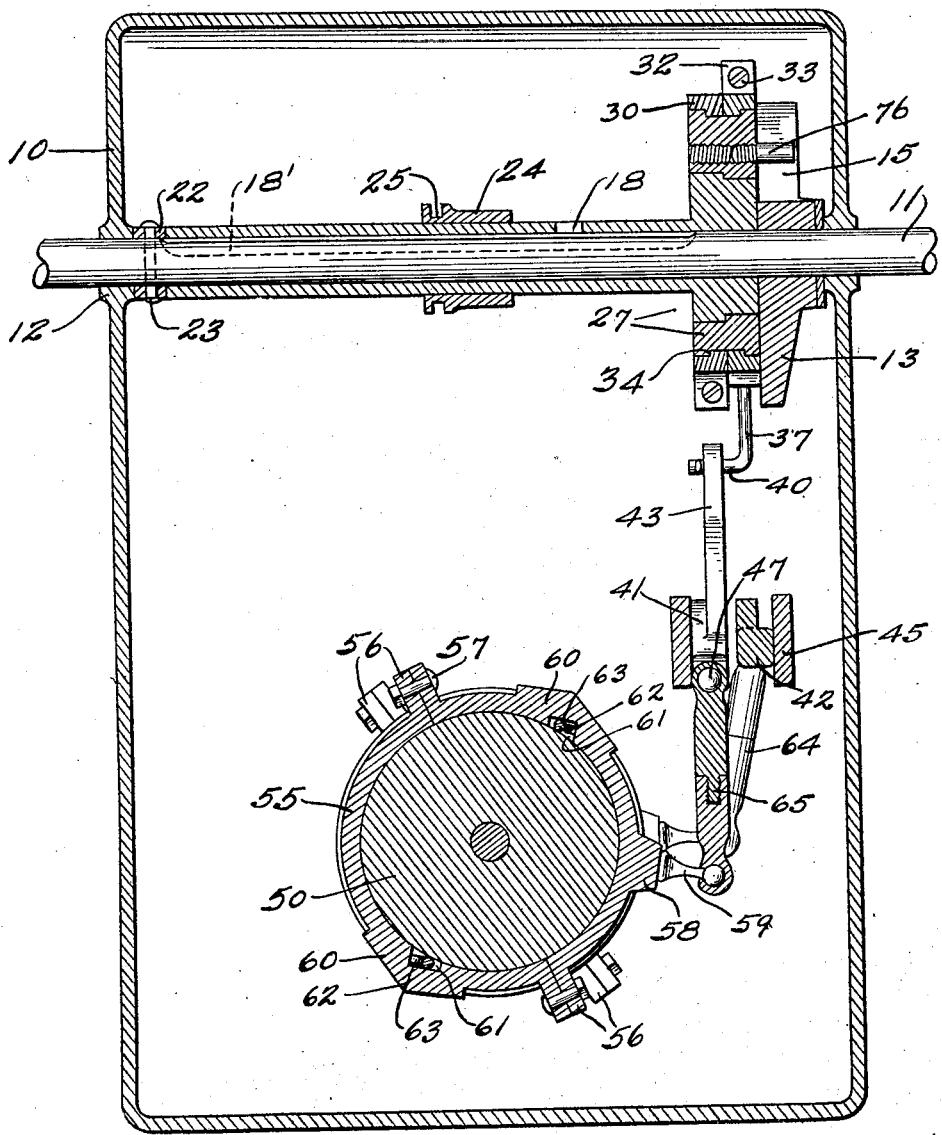

March 31, 1925.
O. A. TONN
TRANSMISSION MECHANISM
Filed July 22, 1924   4 Sheets-Sheet 4
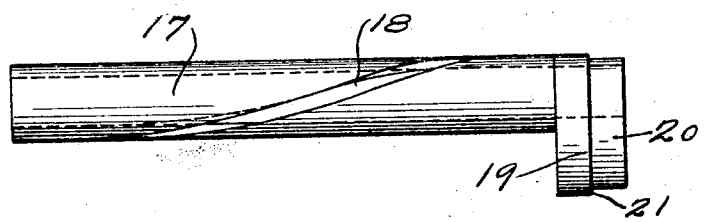
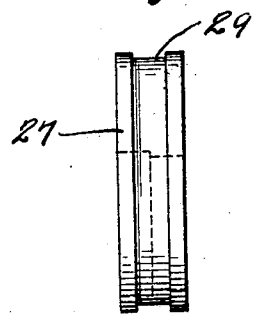
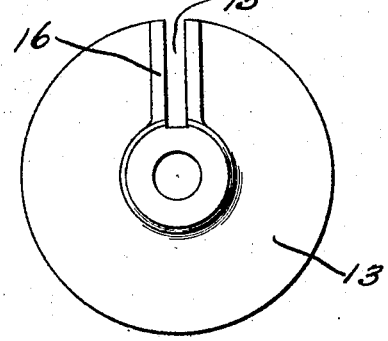
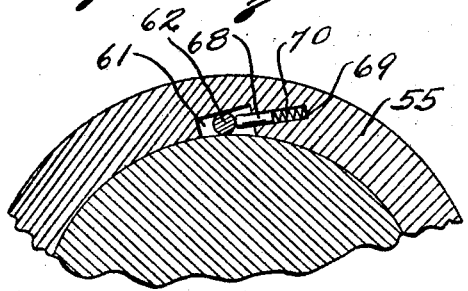
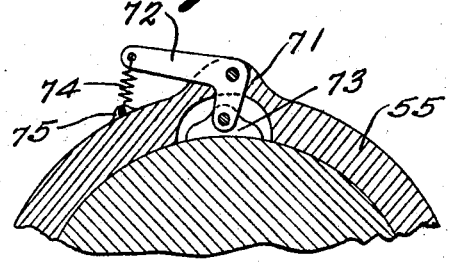
Inventor
Otto A Tonn.

Patented Mar. 31, 1925.

1,531,529

UNITED STATES PATENT OFFICE.

OTTO A. TONN, OF HAVEN, KANSAS.

TRANSMISSION MECHANISM.

Application filed July 22, 1924. Serial No. 727,475.

*To all whom it may concern:*

Be it known that I, OTTO A. TONN, a citizen of the United States, residing at Haven, in the county of Reno and State of Kansas, have invented certain new and useful Improvements in Transmission Mechanism, of which the following is a specification.

This invention relates to mechanisms for transmitting power from a driving to a driven shaft.

An important object of the invention is to provide a transmission mechanism whereby the speed ratio between the shafts may be readily varied.

A further object of the invention is the provision of a transmission mechanism which will operate smoothly and noiselessly.

A still further object of the invention is the provision of a mechanism of this character which is flexible in operation and obviates the employment of toothed gear members.

A still further object of the invention is the provision of a transmission mechanism which is comparatively simple in construction, positive in operation, and very efficient.

Other objects and advantages of this invention will be apparent during the course of the following description.

Figure 1:
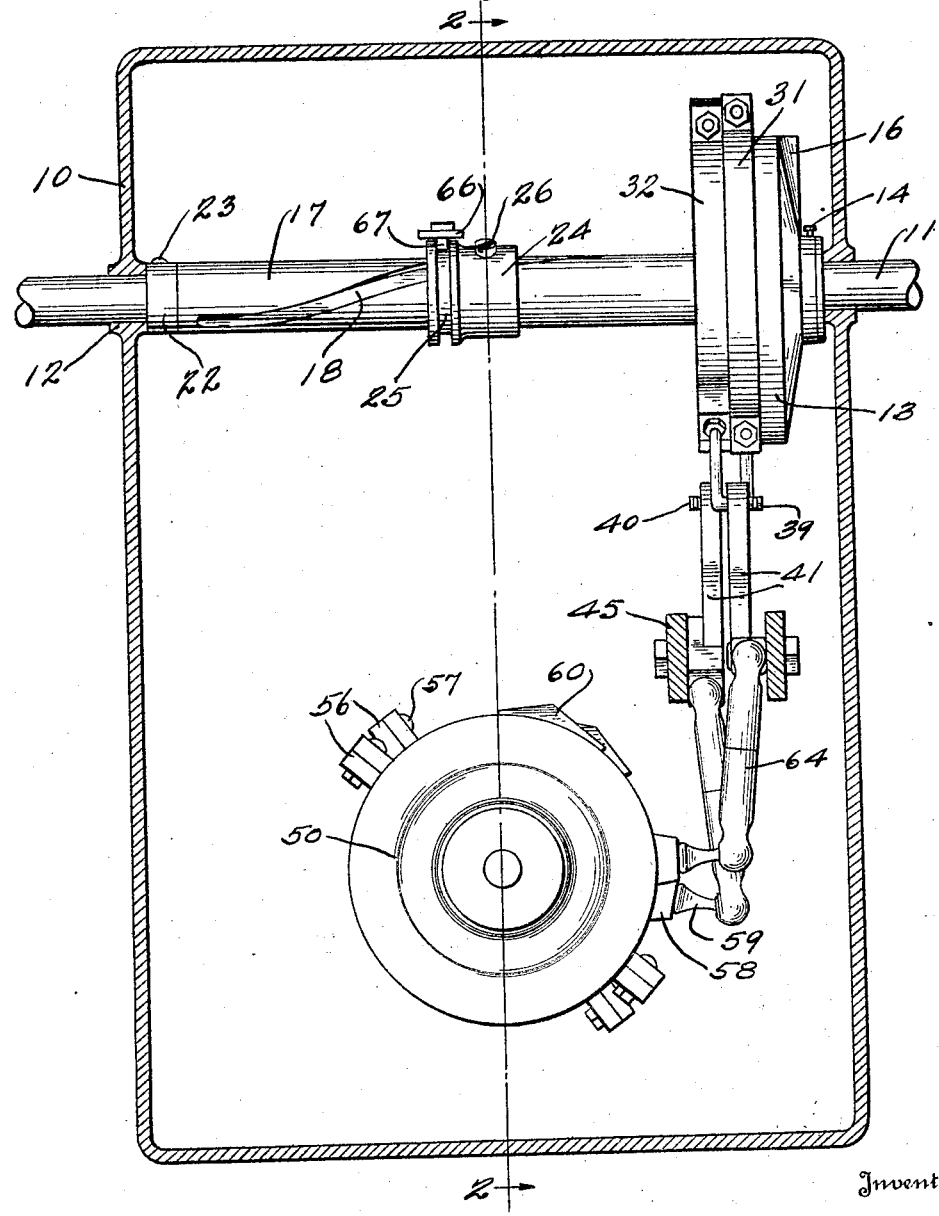
Figure 2:
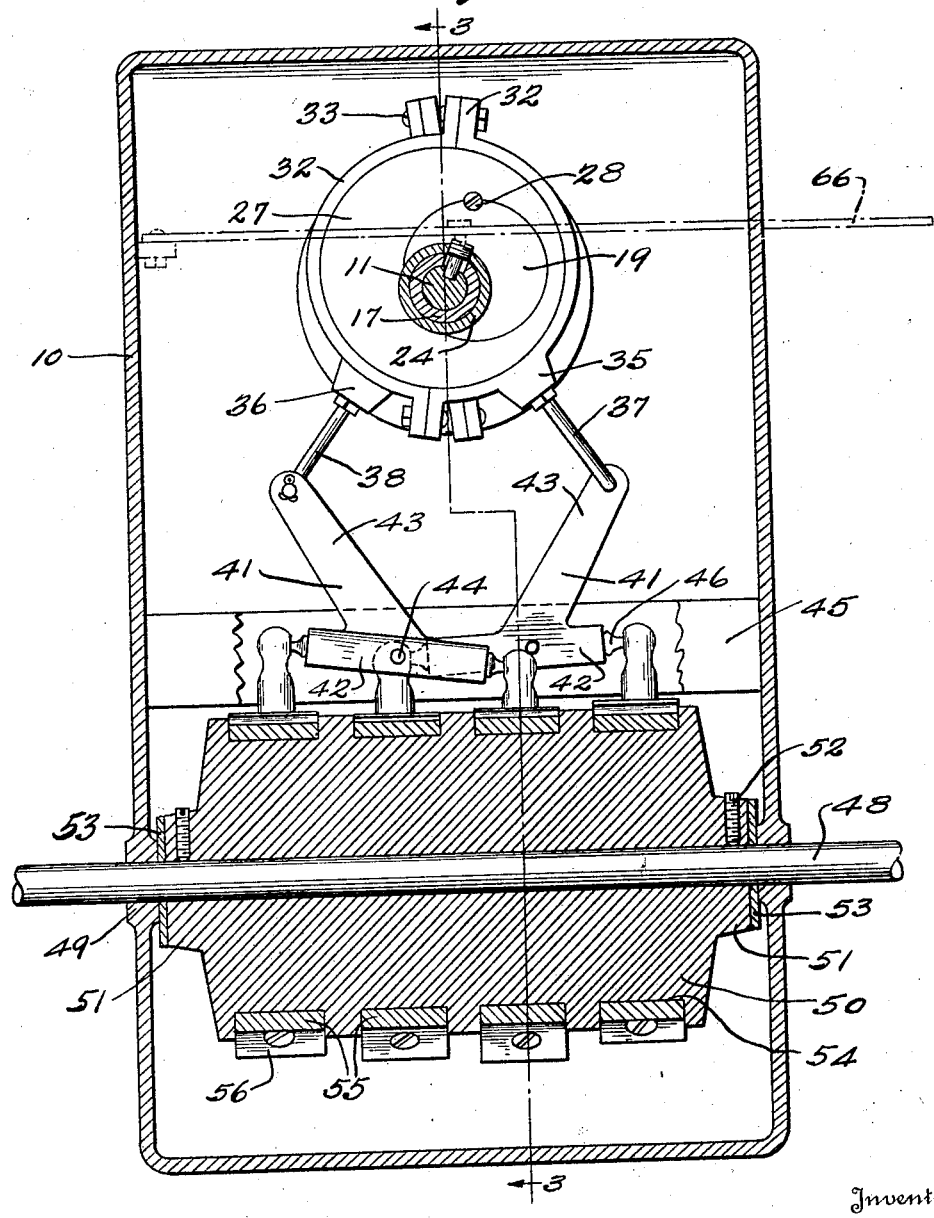

In the accompanying drawings forming a part of this specification and in which like numerals are employed to designate like parts throughout the same:

Figure 1 is a side elevation of my improved mechanism a portion of the casing being removed, Figure 2 is a vertical sectional view taken on the line 2—2 of Figure 1, Figure 3 is a vertical sectional view taken on the line 3—3 of Figure 2, Figure 4 is a detail view showing the sleeve and eccentric, Figure 5 is a side elevation of the eccentric collar, Figure 6 is a front elevation of the driving plate, Figure 7 is a modified form of driving means, and Figure 8 is still another form of driving means.

In the drawings, wherein for the purpose of illustration is shown the preferred embodiment of my invention, the numeral 10 generally indicates the casing or housing which is adapted to enclose the mechanism. This casing may be constructed in any desired manner but is preferably oil tight in order to retain the oil which may be placed therein for lubricating the mechanism.

Journaled longitudinally through the upper portion of the casing is a driving shaft 11 rotatably mounted upon bearings 12 formed on the casing 10. This shaft is connected with the source of power, and carries a circular driving plate 13 which is secured to the forward extremity of the shaft by a set screw 14. The driving plate 13 has a slot 15 formed radially therein, as clearly shown in Figure 6, a pair of guide webs 16 being formed adjacent the slot to further strengthen the same. Mounted on the central portion of the shaft 11 is a longitudinal sleeve 17 the intermediate portion thereof being provided with a spiral guide slot 18. Formed on the forward extremity of the sleeve 17 is an eccentric 19, the forward portion of the eccentric being slightly smaller in diameter as shown at 20 to form an engaging shoulder 21 thereon. A spacing collar 22 is positioned upon the rear portion of the shaft 11 between the sleeve 17 and the bearing 12, this collar being secured to the shaft by a pin 23 extending through the collar and shaft and riveted or otherwise secured in position thereon.

A shifting collar 24 is rotatably mounted upon the sleeve 17, this collar having formed near the extremity an angular groove 25, the intermediate portion being provided with a threaded opening adapted to receive the threaded extremity of the guide pin 26. A comparatively wide eccentric collar 27 is mounted upon the eccentric 19, being retained thereon by the driving plate 13 and a screw 28 threadedly mounted in a suitable recess formed in the adjoining edges of the eccentric and eccentric collar. The central portion of the eccentric collar 27 is provided with an annular groove 29 and adapted to retain thereon a pair of straps 30 and 31. These straps are composed of semi-circular sections having connecting flanges 32 formed thereon, these flanges being secured by bolts 33. The adjoining edges of the strap sections are provided with annular projecting rings 34 adapted to engage the central groove formed in the eccentric collar 27 and retain the straps in position thereon. Each of the straps 31 and 32 are provided with extending shoulders 35 and 36, these shoulders being adapted to threadedly engage a pair of rods 37 and 38. The lower extremities of the rods 37 and 38 are bent at right angles to form cranks 39 and 40, adapted to engage suitable openings formed in the extremities of a pair of rocking levers 41.

The rocking levers 41 comprise rectangular shaped bars 42 and inclined extension arms 43 formed on the upper portion of the bars and adapted to actuate the same. The bars 42 are pivoted in the central portions thereof as shown at 44, the pivots being secured in a pair of braces 45 extending transversely across the forward portion of the casing. The extreme ends of the rocking lever bars 42 carry a pair of studs 46 having formed on the outer extremities thereof ball joints 47.

A driven shaft 48 is journaled in the lower portion of the casing in a right angular plane to the upper driving shaft, the driven shaft being rotatably mounted in suitable bearings 49 formed on the casing 10. The intermediate portion of the shaft 48 carries a comparatively large cylindrical drum member 50 the extremities thereof being provided with hubs 51. The hubs are provided with threaded openings adapted to receive threaded set screws 52 threaded in the openings and adapted to secure the drum 50 upon the shaft 48 and cause rotation of the drum with the shaft. A pair of washers 53 are mounted at the extreme ends of the drum hubs between the same and the bearings 49 to enable the same to be readily rotated. The outer periphery of the drum 50 is provided with four annular grooves 54 suitably machined to receive driving collars 55. These driving collars are composed of two semi-circular sections provided with connecting flanges 56 having suitable openings formed therein for the reception of retaining bolts 57. One section of each of the driving collars 55 is provided with an extension shoulder 58 having threadedly mounted therein an extension stud 59 for the purpose of making the lower ball and socket connection. Each of the sections comprising the collars has also formed thereon an extension 60 provided for the purpose of strengthening the sections about transverse grooves 61 formed on the inner face of the section.

The transverse grooves 61 are formed at angular inclination with the sections forming tapering recesses adapted to receive cylindrical rod sections or rollers 62, transversely positioned within the recesses and forced towards the narrow extremity thereof by V-shaped spring members 63.

The ball joints formed on the extremity of the lugs secured to the driving collar and rocking levers engage suitable sockets formed on the extreme ends of the connecting rod 64, these rods being preferably constructed of two sections, one section being provided with a threaded extension stud 65 while the other section is provided with a threaded opening adapted to receive the same, thus permitting adjustment of the connecting rods when desirable.

The shifting collar 24 is actuated by means of a pivoted lever 66 pivotally mounted on one side of the casing and extending through the opposite side and having a guide pin 67 threaded or otherwise connected to the same in the intermediate portion opposite the groove formed in the shifting collar. The pin 67 is positioned within the groove and adapted to slide the collar 24 upon the sleeve 17 when similar movement is imparted to the lever 66.

In Figure 7 I have illustrated a modified form of driving mechanism, the driving collars 55 in this instance being provided with recesses similar to that employed upon the preferred form, the main difference consisting in the method of normally retaining the roller in the reduced portion of the recess, this being accomplished by providing a cylindrical pin member 67 slidably mounted in a suitable bore 69. A coil spring 70 is positioned in the extreme end of the bore 69 and has a tendency to force the pin 68 outwardly and retain same against the roller and forcing the roller toward the reduced end of the recess.

Still another form of driving mechanism is shown in Figure 8, this form comprising extension lugs 71 formed upon the outer periphery of the driving collar 65 to which are pivoted bell crank levers 72, one edge of the bell crank being comparatively short and having an arcuate shoe 73 pivoted at the extremity thereof, this shoe being adapted to engage the rotatable drum member when the driving collars are rotated in the proper direction. The longer arm of the bell crank extends tangentially from the driving collar lug and carries a tension sping 74, the other extremity of the spring being connected to a suitable ear 75 formed on the driving collar. The spring 74 has a tendency to draw the longer arm of the lever downwardly, that is toward the collar and thereby retain the shoe in contact with the drum member, thus insuring a positive grip upon the outer periphery of the drum when driving the same.

In using my improved mechanism, the motor or other source of power is connected to the driving shaft 11 rotating the same. It is obvious that the driving shaft 11 will also carry the driving plate which necessarily will cause similar rotation of the eccentric collar 27, this being accomplished by means of a drive pin 76 threadedly mounted in the recess formed in the eccentric collar and extending within the slot formed in the driving plate. The throw of the eccentric collar 27 will depend upon the position of the shifting collar 24, movement of this collar rotating the eccentric within the eccentric collar and governing the throw thereof. When the collar is in the central position as shown in Figures 1 and 3, the transmission mechanism will operate at an intermediate speed ratio. When the shifting collar is at the extreme rear position the sleeve 17 and eccentric carried thereby will be rotated in relation to the driving shaft 11, this being accomplished by means of the guide pin 26 secured to the shifting collar, this pin extending through the spiral groove 18 formed in the sleeve and the longitudinal groove 18' formed in the drive shaft. It is obvious that axial movement of this collar will necessarily rotate the sleeve upon the shaft and change the position of the eccentric. In this extreme position of the collar upon the drive shaft the eccentric collar 27 will be concentric with the shaft, this constituting the neutral position of the mechanism and imparting no power to the driven shaft. In the extreme forward position the collar will cause the shaft to be in an eccentric position in relation to the eccentric collar, rotation of the shaft in this position imparting eccentric motion to the collar 27 and straps carried thereon. As the eccentric collars rotate in this position the eccentric rods mounted upon the straps 30 and 31 will oscillate the rocking levers 41. The connecting rods secured to the extremities of the levers by means of ball and sockets will impart similar movement to the driving collars. As shown in Figure 3 the downward movement of the driving collars will cause the rollers 62 to become wedged in the tapered recesses and rotate the drum with the collar, the reverse or upward movement of the driving collar causing the roller to move toward the enlarged sections of the recesses and disengaging the rollers from the drum. As each of the driving collars are successively rotated a steady movement will be imparted to the driven shaft, this movement being regulated by movement of the shifting collar upon the drive shaft. It is obvious that by means of this mechanism any desirable speed ratio may be obtained as the shifting collar may be placed in any desired position upon the sleeve 17.

This mechanism may be readily employed wherever it is desirable to regulate the speed ratio between driving and driven shafts. If necessary the shafts may be positioned in parallel planes, it being merely necessary to slightly modify the structure herein shown.

It is to be understood that the form of my invention herewith shown and described is to be taken as the preferred example of the same, and that various changes as to the shape, size, and arrangement of parts may be resorted to without departing from the spirit of the invention, or the scope of the subjoined claims.

Having thus described my invention, I claim:

1. The combination with a drive shaft, of a driven shaft, an eccentric rotatably mounted upon the said drive shaft, means for rotating the said eccentric in relation to the said drive shaft, strap members actuated by movement of the said eccentric, a drum member mounted upon the driven shaft adapted to rotate therewith, a plurality of driving collars mounted upon the said drum, a pair of rocking levers, means for connecting the upper extremity of the rocking levers with the eccentric straps, connecting rods secured to the lower extremities of the rocking levers and suitable projecting arms formed on the driving collars, and means formed on the driving collars for rotating the drum member.

2. The combination with a drive shaft, of a driven shaft, an eccentric mounted upon the drive shaft adapted to rotate in relation therewith, a driving plate secured to the drive shaft and adapted to rotate the said eccentric member, a pair of actuating straps mounted upon the said eccentric, a cylindrical drum member secured to the said driven shaft, a plurality of driving collars mounted upon the said drum member, a plurality of rocking levers, connecting rods adapted to connect the rocking levers with projections formed on the driving collars, extension rods formed on the eccentric collars and adapted to actuate the rocking levers, driving rollers mounted in suitable recesses formed in the driving collars adapted to rotate the said drum member, and means for retaining the said driving rollers in engagement with the said drum.

3. In combination with a driving shaft, of a driven shaft, a cylindrical drum member secured to said driven shaft, an eccentric having a longitudinal sleeve formed integral therewith rotatably mounted upon the said drum, means for retaining the said eccentric and sleeve upon the said drive shaft, an eccentric collar mounted upon the said eccentric, eccentric strap members mounted upon the said eccentric collars, a driving plate secured to the said drive shaft and adapted to rotate the said eccentric collar, projecting crank members secured to the lower portion of the said eccentric collars, rocking levers having their upper extremity connected to the said crank members, a cylindrical drum member having a plurality of annular grooves secured to the said driven shaft, a plurality of driving collars mounted upon the said drum member, projecting studs secured to the said driving collars, connecting rods secured to the said driving collar studs and rocking lever extremities, driving rollers mounted within suitable recesses formed in the driving collar, and means for retaining the said driving rollers in frictional contact with the said drum members.

4. In combination with a driving shaft having a longitudinal slot formed therein, of a driven shaft, an eccentric having a sleeve formed thereon mounted upon the said drive shaft, means for rotatably adjusting the said eccentric on the said drive shaft, an eccentric collar mounted upon the said eccentric, a drive plate mounted on the drive shaft and adapted to rotate the said eccentric collar, eccentric straps mounted upon the said eccentric collar, angular crank rods secured to the lower portions of the said eccentric straps, a cylindrical drum member having annular grooves formed therein secured to the said driven shaft, a plurality of driving collars rotatably mounted upon the said drum, driving pin members positioned within suitable recesses formed on the inner periphery of the driving collars adapted to actuate the said drum members, spring members mounted within the said recesses and adapted to retain the said driving pins in the reduced portions thereof, extension lugs formed upon the said driving collars, a pair of rocking levers connecting with the angular rods at their upper extremities, and a plurality of connecting rods connected to the extension lugs formed on the driving collars and similar lugs formed on the extremities of the rocking levers.

In testimony whereof, I have affixed my signature in the presence of two witnesses.

OTTO A. TONN.

Witnesses:
JOHN H. KOCH,
HERMAN TONN.